United States Patent
Senior et al.

(10) Patent No.: US 10,733,979 B2
(45) Date of Patent: Aug. 4, 2020

(54) LATENCY CONSTRAINTS FOR ACOUSTIC MODELING

(71) Applicant: Google LLC, Mountain View, CA (US)

(72) Inventors: Andrew W. Senior, New York, NY (US); Hasim Sak, New York, NY (US); Kanury Kanishka Rao, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 1103 days.

(21) Appl. No.: 14/879,225

(22) Filed: Oct. 9, 2015

(65) Prior Publication Data

US 2017/0103752 A1  Apr. 13, 2017

(51) Int. Cl.
*G10L 15/16* (2006.01)
*G06N 3/04* (2006.01)

(52) U.S. Cl.
CPC ............ *G10L 15/16* (2013.01); *G06N 3/0445* (2013.01); *G06N 3/0454* (2013.01)

(58) Field of Classification Search
None
See application file for complete search history.

(56) References Cited

U.S. PATENT DOCUMENTS

| | | | |
|---|---|---|---|
| 6,829,578 B1* | 12/2004 | Huang | G10L 15/1807 704/205 |
| 2002/0059068 A1* | 5/2002 | Rose | G10L 15/08 704/246 |
| 2015/0095027 A1* | 4/2015 | Parada San Martin | G10L 15/02 704/232 |
| 2016/0364522 A1* | 12/2016 | Frey | G06F 19/22 |

OTHER PUBLICATIONS

Li et al. Towards End-to-End Speech Recognition for Chinese Mandarin using Long Short-Term Memory Recurrent Neural Networks. INTERSPEECH 2015 Sep. 6-10, 2015, Dresden, Germany (Year: 2015).*

Strauß et al. CITlab ARGUS for historical handwritten documents. Description of CITlab's System for the HTRtS 2014 Handwritten Text Recognition Task. 2014 (Year: 2014).*

(Continued)

*Primary Examiner* — Alexey Shmatov
*Assistant Examiner* — Robert Bejcek, II
(74) *Attorney, Agent, or Firm* — Honigman LLP; Brett A. Krueger; Grant Griffith

(57) ABSTRACT

Methods, systems, and apparatus, including computer programs encoded on computer storage media for acoustic modeling of audio data. One method includes receiving audio data representing a portion of an utterance, providing the audio data to a trained recurrent neural network that has been trained to indicate the occurrence of a phone at any of multiple time frames within a maximum delay of receiving audio data corresponding to the phone, receiving, within the predetermined maximum delay of providing the audio data to the trained recurrent neural network, output of the trained neural network indicating a phone corresponding to the provided audio data using output of the trained neural network to determine a transcription for the utterance, and providing the transcription for the utterance.

17 Claims, 6 Drawing Sheets

(56) References Cited

OTHER PUBLICATIONS

Jung et al. A Variable Frame Length and Rate Algorithm based on the Spectral Kurtosis Measure for Speaker Verification. INTERSPEECH 2010. Sep. 26-30, 2010, Makuhari, Chiba, Japan. (Year: 2010).*
Chen et al. Delay-dependent exponential stability of neural networks with variable delays. Physics Letters A 326 (2004) 355-363. (Year: 2004).*
Chen et al. Delay-Dependent Exponential Stability of Neural Networks With Variable Delay: An LMI Approach. IEEE Transactions on Circuits and Systems—II: Express Briefs, vol. 53, No. 9, Sep. 2006 (Year: 2006).*
Mou et al. New Delay-Dependent Exponential Stability for Neural Networks With Time Delay. IEEE Transactions on Systems, Man, and Cybernetics—Part B: Cybernetics, vol. 38, No. 2, Apr. 2008 (Year: 2008).*
Graves et al. "Speech Recognition with Deep Recurrent Neural Networks," arXiv Preprint arXiv 1303.5778v1, Mar. 22, 2013, 5 pages.
Graves, "Supervised Sequence Labelling with Recurrent Neural Networks," Studies in Computational Intelligence, vol. 385, 137 pages, 2012.
Sak et al., "Sequence Discriminative Distributed Training of Long Short-Term Memory Recurrent Neural Networks," Interspeech (2014), 5 pages, 2014.
"Artificial neural network," From Wikipedia, the free encyclopedia, last modified on Oct. 4, 2015 [retrieved on Oct. 8, 2015]. Retrieved from the Internet: URL<https://en.wikipedia.org/wiki/Artificial_neural_network>, 14 pages.
"Convolutional neural network," From Wikipedia, the free encyclopedia, last modified on Sep. 10, 2015 [retrieved on Oct. 8, 2015]. Retrieved from the Internet: URL<https://en.wikipedia.org/wiki/Convolutional_neural_network>, 9 pages.
"Long short-term memory," From Wikipedia, the free encyclopedia, last modified on Oct. 5, 2015 [retrieved on Oct. 8, 2015]. Retrieved from the Internet: URL<https://en.wikipedia.org/wiki/Long_short-term_memory>, 4 pages.
"Recurrent neural network," From Wikipedia, the free encyclopedia, last modified on Sep. 30, 2015 [retrieved on Oct. 8, 2015]. Retrieved from the Internet: URL<https://en.wikipedia.org/wiki/Recurrent_neural_network>, 9 pages.
"Speech recognition," From Wikipedia, the free encyclopedia, last modified on Oct. 1, 2015 [retrieved on Oct. 8, 2015]. Retrieved from the Internet: URL<https://en.wikipedia.org/wiki/Speech_recognition>, 16 pages.
"Time delay neural network," From Wikipedia, the free encyclopedia, last modified on Mar. 23, 2015 [retrieved on Oct. 8, 2015]. Retrieved from the Internet: URL:https://en.wikipedia.org/wiki/Time_delay_neural_network>, 1 page.
Bahl et al., "Context Dependent Modeling of Phones in Continuous Speech Using Decision Trees," HLT '91 Proceedings of the workshop on Speech and Natural Language, pp. 264-269, 1991.
Bluche et al., "Framewise and CTC Training of Neural Networks for Handwriting Recognition," International Conference on Document Analysis and Recognition—ICDAR, 2015, pp. 81-85.
Eyben et al., "From Speech to Letters—Using a Novel Neural Network Architecture for Grapheme Based ASR," Automatic Speech Recognition & Understanding, 2009, ASRU 2009, IEEE Workshop on, pp. 376-380, 2009.
Fernandez et al., "Phoneme recognition in TIMIT with BLSTM-CTC," Technical Report No. IDSIA—Apr. 2008, Apr. 2008, 7 pages.
Fiscus, "A post-processing system to yield reduced word error rates: Recognizer output voting error reduction (ROVER)," in IEEE Automatic Speech Recognition and Understanding Workshop (ASRU), Dec. 1997, pp. 347-354.
Graves et al., "A Novel Connectionist System for Unconstrained Handwriting Recognition," Pattern Analysis and Machine Intelligence, IEEE Transactions on, 31(5):855-868, May 2008.
Graves et al., "Connectionist Temporal Classification: Labelling Unsegmented Sequence Data with Recurrent Neural Networks," Proceedings of the 23$^{rd}$ International Conference on Machine Learning, ACM, 2006, pp. 369-376.
Graves et al., "Framewise phoneme classification with bidirectional LSTM and other neural network architectures," Neural Networks, vol. 12, pp. 5-6, 2005.
Graves et al., "Speech Recognition With Deep Recurrent Neural Networks," arXiv:1303.5778v1 [cs.NE], Mar. 2013, 5 pages.
Graves et al., "Towards End-to-End Speech Recognition with Recurrent Neural Networks," Proceedings of the 31$^{st}$ International Conference on Machine Learning, vol. 32, pp. 1764-1772, 2014.
Grosz et al., "A Sequence Training Method for Deep Rectifier Neural Networks in Speech Recognition," Speech and Computer. Springer International Publishing, 2014, pp. 81-88.
Hinton et al., "Distilling the Knowledge in a Neural Network," arXiv:1503.02531v1 [stat.ML], Mar. 2015, pp. 1-9.
Hochreiter and Schmidhuber, "Long short-term memory," Neural Computation, 9(8):1735-1780, Nov. 1997.
MathWorks Support Team, "Is it possible to impose constraints on a neural network using Neural Network Toolbox?" MATLAB Answers™, Jun. 27, 2009 [retrieved on Oct. 8, 2015]. Retrieved from the Internet: URL<http://www.mathworks.com/matlabcentral/answers/99132-is-it-possible-to-impose-constraints-on-a-neusal-network-using-neural-network-toolbox>, 3 pages.
Rao et al., "Grapheme-to-Phoneme Conversion Using Long Short-Term Memory Recurrent Neural Networks," Proceedings of ICASSP, 2015, 5 pages.
Robinson et al., "A recurrent error propagation network speech recognition system," Computer Speech and Language, 5(3):259-274, Jul. 1991.
Sainath et al., "Convolutional, long short-term memory, fully connected deep neural networks," in IEEE International Conference on Acoustics, Speech, and Signal Processing (ICASSP), 2015, 5 pages.
Sainath et al., "Deep Convolutional Neural Networks for LVCSR," Acoustics, Speech and Signal Processing (ICASSP), 2013 IEEE International Conference on, pp. 8614-8618, Dec. 2013.
Sak et al., "Fast and accurate recurrent neural network acoustic models for speech recognition," arXiv:1507.06947v1 [cs.CL], Jul. 2015, 5 pages.
Sak et al., "Learning Acoustic Frame Labeling for Speech Recognition With Recurrent Neural Networks," Acoustics, Speech and Signal Processing (ICASSP), 2015 IEEE International Conference on, pp. 4280-4284, 2015.
Sak et al., "Long Short-Term Memory Recurrent Neural Network Architectures for Large Scale Acoustic Modeling," Proceedings of the Annual Conference of International Speech Communication Association (INTERSPEECH) 2014, Sep. 2014, pp. 338-342.
Saon et al., "The IBM 2015 English conversational telephone speech recognition system," arXiv:1505.05899v1 [cs.CL], May 2015, 5 pages.
Senior et al., "Context dependent phone models for LSTM RNN acoustic modelling," in IEEE International Conference on Acoustics, Speech, and Signal Processing (ICASSP), pp. 4585-4589, Apr. 2015.
Song et al., "End-to-End Deep Neural Network for Automatic Speech Recognition," Stanford University, CS224d: Deep Learning for Natural Language Processing, 2015 Report, pp. 1-8.
Vesely et al., "Sequence-discriminative training of deep neural networks," INTERSPEECH, 2013, pp. 2345-2349.
Wollmer et al., "Probabilistic ASR Feature Extraction Applying Context-Sensitive Connectionist Temporal Classification Networks," Acoustics, Speech and Signal Processing (ICASSP), 2013 IEEE International Conference on, pp. 7125-7129, 2013.

* cited by examiner

LATENCY CONSTRAINTS FOR ACOUSTIC MODELING

BACKGROUND

This specification relates to acoustic modeling.

Acoustic models may receive an acoustic sequence and generate a phone representation of the acoustic sequence. An acoustic modeling system can be used in, for example, a speech recognition system, e.g., in conjunction with a pronunciation model and a language model.

SUMMARY

In general, one innovative aspect of the subject matter described in this specification can be embodied in methods that include the actions of receiving audio data representing a portion of an utterance; providing the audio data to a trained recurrent neural network that has been trained to indicate the occurrence of a phone at any of multiple time frames within a maximum delay of receiving audio data corresponding to the phone; receiving, within the predetermined maximum delay of providing the audio data to the trained recurrent neural network, output of the trained neural network indicating a phone corresponding to the provided audio data; using output of the trained neural network to determine a transcription for the utterance; and providing the transcription for the utterance.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations providing the audio data to a trained recurrent neural network comprises providing the audio data to a trained recurrent neural network that has been trained to apply connectionist temporal classification labels identifying phones corresponding to input audio data.

In other implementations providing the audio data to a trained recurrent neural network comprises providing the audio data to a trained recurrent neural network that has been trained using a forward-backward algorithm restricted to search paths in which a delay between assigned connectionist temporal classification labels of phones and actual occurrences of the respective phones does not exceed a maximum amount.

In some cases providing the audio data to a trained recurrent neural network comprises providing the audio data to a trained recurrent neural network that has been trained to apply penalties in order to penalize search paths in which a delay between assigned CTC labels of phones and actual occurrences of the respective phones exceeds a maximum amount.

In other cases the trained recurrent neural network comprises a convolutional layer, and the trained recurrent neural network is configured such that input to the trained recurrent neural network is provided to the convolutional layer.

In some implementations the trained recurrent neural network comprises one or more long short-term memory layers, and the trained recurrent neural network is configured to provide output of the convolutional layer to the one or more long short-term memory layers.

In other implementations the trained recurrent neural network comprises a deep neural network, and the trained neural network is configured to provide output of the one or more long short-term memory layers to the deep neural network.

In some cases the trained recurrent neural network is trained with a constraint to assign phone labels for the utterance in a same sequence that the phones occur in the utterance.

In some implementations providing the audio data to a trained recurrent neural network comprises providing the audio data to a trained recurrent neural network that has been trained such that each of the multiple connectionist temporal classification labels are respectively provided by the model within a predetermined maximum amount of time.

In further implementations providing the audio data to a trained recurrent neural network comprises providing the audio data to a trained recurrent neural network that has been trained to provide context-dependent phone labels; wherein receiving the output of the trained neural network comprises receiving, at a delay determined by the trained neural network that is less than the maximum delay, data assigning a context-dependent phone label identifying the phone corresponding to the provided audio data.

In some implementations receiving audio data representing a portion of an utterance comprises, receiving, at a server system configured to provide a speech recognition service over a computer network, audio data from a client device representing a portion of an utterance detected by the client device; wherein providing the transcription comprises providing, by the server system, the transcription to the client device over the computer network in response to receiving the audio data from the client device.

The subject matter described in this specification can be implemented in particular embodiments so as to realize one or more of the following advantages. An acoustic modeling system implementing latency constraints may achieve a desired level of classification accuracy and recognition accuracy, while reducing the time delay between an acoustic frame presentation and a label output, e.g., reducing the time delay in the decoding of speech.

By constraining forward-backward alignment in training, additional latency from system self-alignment can be controlled and reduced. An acoustic modeling system implementing latency constraints may therefore achieve improved performance in terms of computation time compared to other acoustic modeling systems. For example, an acoustic modeling system implementing latency constraints can reduce the delay for a real-time streaming speech recognition system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Neural networks can be trained as acoustic models. For example, a neural network may be trained to classify a sequence of acoustic data to generate a sequence of phones or phone subdivisions representing the acoustic data. To classify a particular frame or segment of acoustic data, an acoustic model can evaluate context, e.g., acoustic data for previous and subsequent frames, in addition to the particular frame being classified. In some instances, a recurrent neural network may be trained to label acoustic data using connectionist temporal classification (CTC). Through the recurrent properties of the neural network, the neural network may accumulate and use information about future context to classify an acoustic frame. The neural network is generally permitted to accumulate a variable amount of future context before indicating the phone that a frame represents. Typically, when connectionist temporal classification (CTC) is used, the neural network can use an arbitrarily large future context to make a classification decision, which results in an arbitrarily long and variable delay in classifying a frame. In some applications, such as speech recognition of live-streaming speech, long and arbitrary delays are undesirable.

In some implementations, an acoustic modeling system may apply latency constraints in order to limit the latency of acoustic model output. For example, the acoustic model can be trained to indicate the occurrence of a phone within a maximum delay of receiving audio data corresponding to the phone. The acoustic model may be able to indicate the phone label at any of multiple time periods within a limited time range or window of receiving audio data for the phone. During training, constraints may be enforced so that outputs that exceed a maximum delay are penalized or disallowed. For example, a training example can include a sequence of frames representing an utterance. The frames are assigned phone labels to create a "ground truth" alignment of phones in the utterance to frames in the sequence. During training, the parameters of the acoustic model are adjusted so that the acoustic model indicates the occurrence of each phone within a defined range of where the phone occurs in the ground truth alignment. For example, the training process can constrain the acoustic model to provide classification labels within a defined number of frames or time increments. In some implementations, constraints are applied by limiting a set of search paths used in a forward-backward algorithm. For example, search paths may be limited to those in which the delay between the output of a phone label and the position of the corresponding phone in a ground truth alignment does not exceed a predetermined threshold. As another example, delay may also be limited by applying a penalty to penalize paths that incur excessive delays compared to the ground truth alignment.

Figure 1:
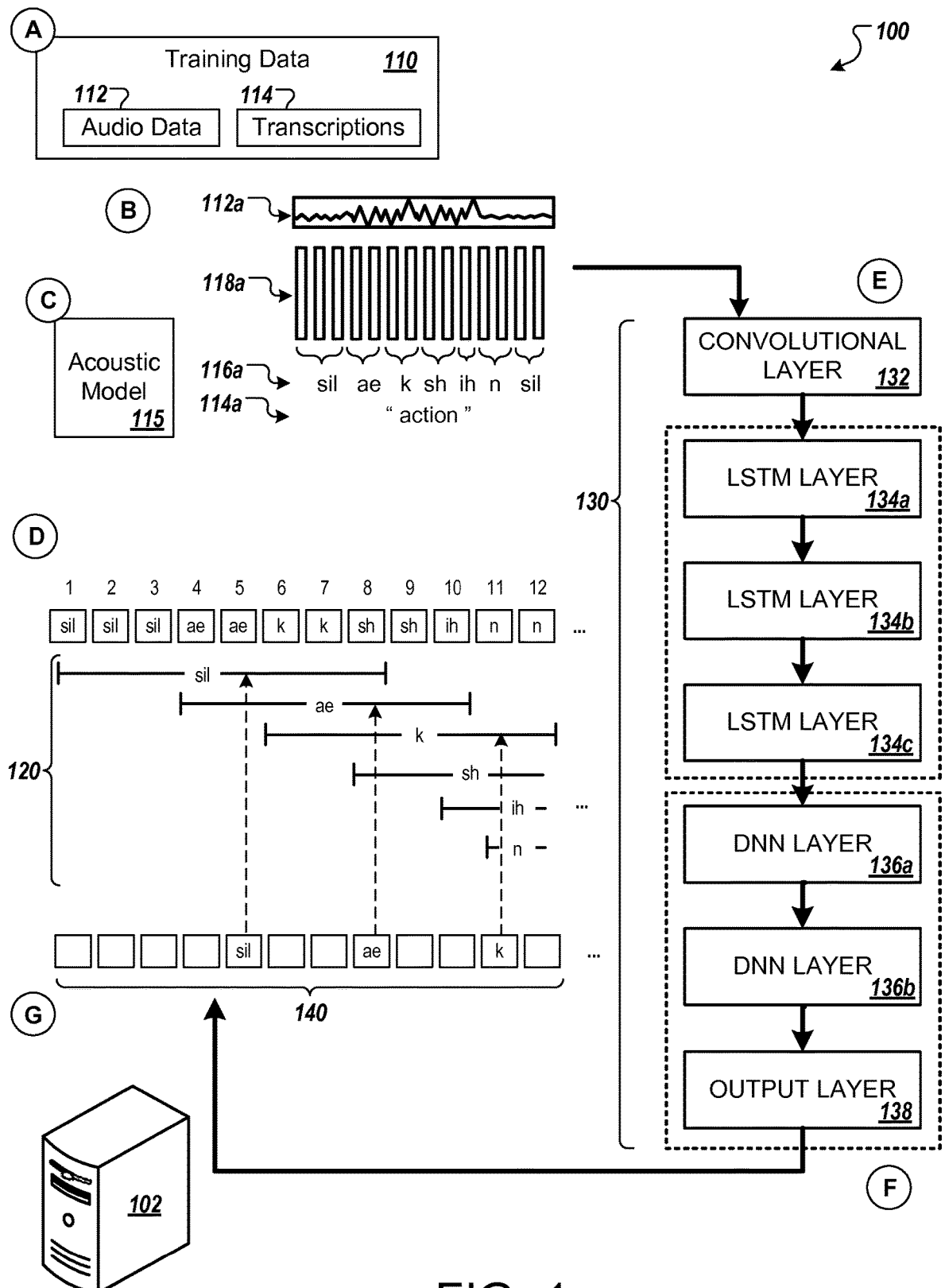
FIG. 1 is a block diagram of an example system for training a neural network with latency constraints.

FIG. 1 is a block diagram of an example system 100 for training a neural network with latency constraints. The figure illustrates a computer system 102 that performs various actions to train a recurrent neural network 130 as an acoustic model. The computer system 102 can include one or more computers in one or more locations.

The system 100 is a machine learning system that includes recurrent neural network 130. The recurrent neural network 130 receives inputs and generates outputs from the inputs. As discussed further below, the neural network 130 may receive data describing an utterance, e.g., vectors describing speech frames 118a, as input and generate a set of phone scores or phone labels 140 as output. As used herein, a "phone" refers to the occurrence of a particular phoneme in a language sequence.

The recurrent neural network 130 includes multiple neural network layers 132-138. The layers are arranged in a sequence from a first layer to a last layer, and data propagates through the neural network 130 from one layer to the next. Each of the layers receives a respective layer input and processes the layer input to generate a respective layer output. The output of the last layer, the output layer 138, represents the output of the neural network 130.

The neural network 130 may include one or more convolutional layers, e.g., convolutional layer 132. In some implementations, the convolutional layer 132 receives and processes the inputs to the neural network 130, for example, as the first processing layer of the neural network 130. For example, the convolutional layer 132 may be the input layer for the neural network 130. In some implementations, multiple convolutional layers 132 may be included in the recurrent neural network. In some implementations, an input layer or one or more other layers may be provided before the convolutional layer 132. An example neural network that includes one or more convolutional layers is described in more detail in "Deep Convolutional Neural Networks for LVCSR," T. Sainath, 2013.

Figures 2A, 2B:
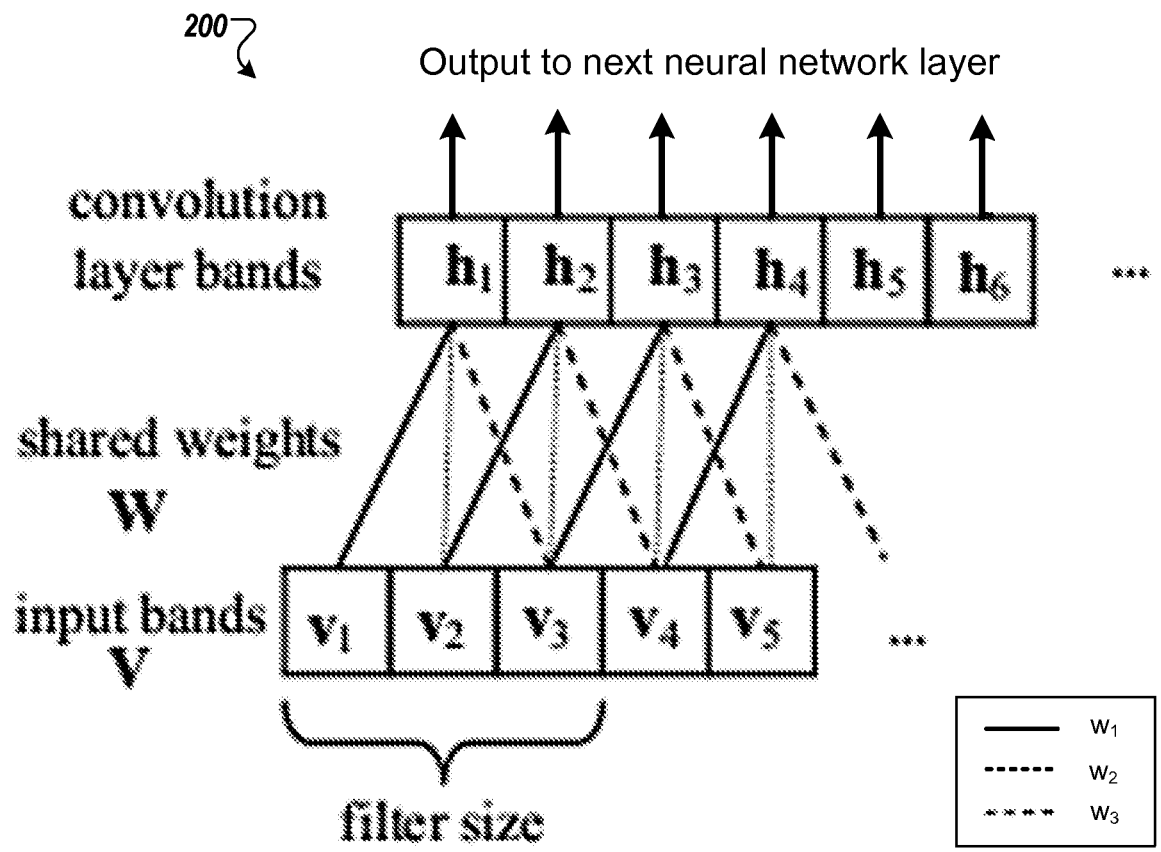
FIG. 2A is a diagram of a convolutional layer of a neural network.
FIG. 2B is a diagram of an output vector from a neural network.

Convolutional layers can be used to reduce spectral variations and model spectral correlations which exist in signals. An example of a convolutional layer 200 is shown in FIG. 2A. In a fully-connected neural network layer, each node, i, typically has its own distinct vector of weights, and the hidden activation, $h_i$, for the node is computed by multiplying the entire input vector for the layer by the vector of weights for the node. In the convolutional layer 200, each hidden activation is based on a localized subset of the values in the input vector, V, for the layer, and the set of weights is shared among multiple nodes. For example, activation at a node i may be computed by multiplying a small local segment of input (e.g., $[v_1; v_2; v_3]$) against a set of weights W (e.g., $[w_1; w_2; w_3]$). The weights W are then shared across the entire input space, applied to different segments of the input vector, V. For example, the same set of shared weights can be applied to different sections of the input or different positions of a sliding window over the input, e.g., $[v_2; v_3; v_4]$, $[v_3; v_4; v_5]$, etc., to generate the different activations of the convolutional layer. In some implementations, a max-pooling layer may be included after the convolutional layer to help to remove variability in the hidden units (e.g., convolutional band activations), that exist due to speaking styles, channel distortions, etc. If used, each max-pooling unit may receive activations from a specific number of convolutional bands, and may output the maximum of the activations from these bands to the next layer.

Referring again to FIG. 1, the neural network 130 may further include one or more Long Short-Term Memory (LSTM) neural network layers, e.g., LSTM layers 134a-

134c. In the recurrent neural network 130, the output of the convolutional layer 132 may be provided as input to the one or more LSTM layers 134a-134c. An LSTM neural network layer is a neural network layer that has one or more LSTM memory blocks. In some implementations, an LSTM memory block includes a memory cell with (i) self-connections that store the temporal state of the network, and (ii) multiplicative units called gates to control the flow of information. While three LSTM layers are illustrated, the neural network 130 may include more or fewer LSTM layers. For example, some implementations may include five LSTM layers. In some implementations, each LSTM layer has several hundred memory blocks, e.g., 600 memory blocks. An example LSTM neural network that can be used to process acoustic features is described in more detail in "Long Short-Term Memory Based Recurrent Neural Network Architectures for Large Scale Acoustic Modeling," H. Sak, *Interspeech* 2014.

The neural network 130 may also include a deep neural network with one or more deep neural network layers, e.g., deep neural network layers 136a and 136b. The neural network 130 may provide output of the one or more LSTM layers 134a-134c to the deep neural network, e.g., to deep neural network layer 136a. While the deep neural network is illustrated as including two deep neural network layers 136a and 136b, the deep neural network may include more or fewer hidden layers. The layers of the deep neural network, including deep neural network layers 136a and 136b, may be fully connected neural network layers.

The deep neural network may also include a connectionist temporal classification (CTC) output layer, e.g., output layer 138. For example, CTC output layer 138 may be a softmax classification layer that processes a layer input to generate a set of output scores. The set of output scores provided at a particular time, e.g., for a particular frame position in a sequence of frames, is referred to below as an output vector. For each vector of input values provided to the recurrent neural network 130, a corresponding output vector is provided at the output layer 138. Due to CTC training and the recurrent properties of the neural network 130, the recurrent neural network 130 can vary the timing that classifications of speech data are provided. Each input vector produces a corresponding output vector, and the output vectors can each be produced with a generally consistent amount of computation time. However, the output vector may not indicate a classification result for the input vector that was most recently propagated through the network. The classification may instead be provided at a variable time in the future, after propagating a variable number of additional input vectors through the neural network 130.

For example, a first input vector may be provided to the recurrent neural network 130, corresponding to a first frame of audio data in which a particular phone is spoken. The output vector produced in response to the first input vector may not indicate that the particular phone has occurred. Instead, the neural network 130 may indicate the occurrence of the phone, for example, after one, two, three, or more additional input vectors are received and corresponding output vectors are provided. The neural network 130 determines, for each phone classification, when to indicate the occurrence of the phone, subject to maximum latency constraints discussed below. The classifications of different portions of an utterance may be provided with different amounts of delay. That is, the neural network 130 may identify one phone of an utterance immediately after propagating a corresponding input vector, but identify another phone of the utterance only after waiting to receive one or more other input vectors. Thus, the output vector that indicates the occurrence of a phone may not occur until after a variable amount of input/output cycles have been completed.

Each output vector produced by the CTC output layer 138 includes a score for each respective phone from a set of phones and also a score for a "blank" symbol. The phones may be context-dependent phones that each represent a phoneme being spoken in a particular phonetic context, e.g., before and/or after the one or more other phonemes are spoken. The score for a particular phone represents a likelihood that the particular phone has occurred in the sequence of audio data inputs provided to the neural network 130. The blank symbol is a placeholder indicating that the neural network 130 does not indicate that any additional phone has occurred in the sequence. Thus the score for the blank symbol represents a likelihood or confidence that an additional phone should not yet be placed in sequence.

The recurrent neural network 138 may be trained to indicate the occurrence of each phone in an utterance only once, e.g., corresponding to only a single frame of the utterance or in only output vector. Even if the duration of a phone spans multiple frames, and thus multiple input vectors, the recurrent neural network 130 may only provide output indicating that the phone has occurred for a single frame. Blank symbols are interspersed between the designations of phones. For example, a "u" phone may occur over three consecutive frames, and when these three frames of speech data are provided, the recurrent neural network 130 may produce two output vectors indicating the blank symbol, and produce one output vector indicating the occurrence of the "u" phone. Further, the output vector indicating the occurrence of the "u" phone does not have a fixed alignment to the three input vectors. Rather, it may be provided in response to propagating any of the three input vectors through the neural network 130, or after also propagating other additional input vectors. In addition, the neural network 130 can be trained to indicate the occurrence of phones of an utterance in the same order that the phones occur in the utterance. Although the timing that a particular phone is indicated may vary within a constrained range, the particular phone may be required to be indicated in the correct sequence relative to the previous and subsequent phones.

The recurrent neural network 130 can be trained using multiple utterances in order to determine trained values of parameters of the recurrent neural network layers, i.e., to adjust the values of internal weights or other parameters from initial values to trained values. For example, during the training, the recurrent neural network 130 can process training data examples that each represent a different utterance, and generate a series of output vectors for each training data example. The series of output vectors can then be used to adjust the values of the parameters of the recurrent neural network 130, such as weight values for different nodes or neurons of the various layers, for example, using a forward-backward algorithm for CTC training.

In training recurrent neural network models, it is common to derive the labels from a forced alignment, but to choose a time delay between the acoustic frame presentation and the label output to give the network future acoustic context on which to base its predictions, akin to the use of a future context window in the frame stacking for GMM or DNN models. Such a delay is typically around 5 frames or 50 ms. With CTC, there is no time alignment supervision since the network is constantly integrating over all possible alignments. This means that recurrent or LSTM layers can vary the delay between acoustics and outputs, using an arbitrarily large future context if that helps optimizing the total sequence probability.

In practice, an unconstrained CTC trained network generally does delay the outputs considerably with respect to the alignment of a DNN. This delay induces latency in the decoding of speech. Some applications of speech recognition include a live streaming service where intermediate results are displayed while the user is still speaking Additional latency from CTC self-alignment is undesirable, so constraints can be placed on the CTC alignment to reduce the delay. Delay can be limited by restricting the set of search paths used in the forward-backward algorithm to those in which the delay between CTC labels and the "ground truth" alignment does not exceed some threshold. In many instances, the word error rate of a constrained neural network is near or equivalent to the error rate of an unconstrained model, but with lower latency and more predictable latency than the unconstrained neural network.

A training process for the recurrent neural network 130 may be described as follows. During operation (A), the computer system 102 accesses training data 110. The training data 110 may include audio data 112 for utterances of many different speakers, and may provide examples of many different spoken words and phrases. The audio data 112 may include, for example, audio waveform data, vectors of extracted speech features such as mel frequency ceptral coefficients (MFCCs), or other data indicating the acoustic characteristics of utterances. The training data 110 may also include transcriptions 114 for the audio data 112, e.g., text representing the utterances, or labels for phones or states of phones that represent the utterances.

Operations (B) through (G) illustrate processing of one training data example from the training data 110, e.g., one utterance of many used to train the recurrent neural network 130. During operation (B), the computer system 102 divides a particular sample of audio data 112a into a series of multiple frames and determines corresponding feature vectors 118a. The computer system 102 splits the audio data 112a into a sequence of multiple frames that correspond to different portions or time periods of the audio data 112a. For example, each frame may describe a different 25-millisecond portion of the audio data 112a. In some implementations, the frames overlap, for example, with a new frame beginning every 10 milliseconds (ms). The computer system 102 may analyze each of the frames to determine feature values for the frames, e.g., MFCCs, log-mel features, or other speech features. For each frame, the computer system 102 generates a corresponding acoustic feature representation. These representations are illustrated as feature vectors 118a that each characterize a corresponding frame time step of the audio data 112a. In some implementations, the feature vectors 118a may include prior context or future context from the utterance. For example, the computer system 102 may generate the feature vector 118a for a frame by stacking feature values for a current frame with feature values for prior frames that occur immediately before the current frame and/or future frames that occur immediately after the current frame. The feature values, and thus the values in the feature vectors 118a, can be binary values.

During operation (C), the computer system 102 obtains a reference alignment between the frames of the audio data 112a and labels 116a for phones that occur in the audio data 112a. Unlike many DNN, HMM, and GMM acoustic models, CTC models learn how to align phones and with audio data and are not limited to a specific forced alignment. To obtain the reference alignment, the computer system 102 may process the audio data 112a using an acoustic model 115, for example, a Gaussian Mixture Model (GMM), Hidden Markov Model (HMM), and/or Deep Neural Network model to obtain a rough alignment. For purposes of training, this rough alignment can be used as a ground truth alignment indicating the positions that phones of the utterance occur in the sequence of frames. In the example of FIG. 1, the audio data 112a represents an utterance having a transcription 114a of "action." The acoustic model 115 may align phone labels 116a, e.g., "\ae," "\k," "\sh," "\ih," "\n," as well as silence "sil," to the frames that make up the transcription 114a for the utterance with the frames of audio data that represent the utterance 118a.

During operation (D), the computer system 102 defines constrained ranges 120 in which the neural network 130 should indicate the presence of phones in the audio data 112a. For example, the ranges can be ranges of time, which can be expressed as ranges of the frames that represent different time periods. The constrained range defines the maximum latency, e.g., maximum amount of time or number of frames, that the neural network 130 can delay indicating that an observed phone has occurred. The constraint effectively limits the amount of future context that the neural network 130 can observe before providing a classification decision about a phone that has been observed.

As discussed above, the utterance can be represented as a sequence of frames. FIG. 1 illustrates the first twelve frames of the audio data 112a, designated frames 1 to 12. Each frame has a corresponding phone label 116a according to the reference alignment. Each phone label 116a may have a corresponding range defined. The ranges 120 can be defined based on where the phone labels 116a are assigned. For example, each phone is represented by one or more consecutive frames having phone labels 116a that identify the same phone. In the example, the phone "\ae" begins at the $4^{th}$ frame and ends at the $5^{th}$ frame. The range 120 for a phone can begin at the first frame where the phone label is assigned and end a predetermined number of frames after the end of a phone. For the phone "\ae," the corresponding range 120 begins at the $4^{th}$ frame (the first frame of the phone), and ends at the $10^{th}$ frame, five frames after the end of the "\ae" phone. This range 120 indicates that a maximum latency of five frames, which equates to 50 ms when using frames 10-milliseconds apart, is permitted after the end of the phone before the neural network 120 indicates that the "\ae" phone has occurred. As another example, the phone labeled "\k" is constrained to a 7-frame window that begins at the $6^{th}$ frame and ends at the $12^{th}$ frame. In the illustrated example, for clarity in illustration, each new frame position is shown corresponding to roughly every 50 ms of audio, so five frames would be represent a constraint of roughly 250 ms.

In some implementations, the constraints are defined so that the occurrence of each phone must be indicated within a consistent maximum latency. For example, for each phone in the audio data 112a, the end of the corresponding range 120 may be defined at the same, pre-determined number of frames after the last frame of the phone. Alternatively, the end of a range may be defined at a particular number of frames after the beginning of a phone. Different acoustic models may be trained with different latency characteristics, for example, with one model allowing for up to 10 frames, e.g., roughly 100 ms, of delay, another model allowing for up to 10 frames, e.g., roughly 200 ms, of delay, and so on. Varying the amount of latency permitted may allow the model to be customized for a particular application, or to achieve a tradeoff between accuracy and latency of recognition results. Defining constrained ranges for phone labels is described below in more detail with reference to FIG. 2C.

In some implementations, the process of defining constraints may include identifying a set of search paths and eliminating search paths that do not satisfy the constraints. For example, training may include constructing a graph of many possible alignments between the audio data 112a and the phone labels 116a. Paths through the graph may represent sequences of CTC labels. For example, the graph may be a decision tree, or similar graph including paths for different numbers of blanks before and after CTC labels derived from the phone labels 116a. Some of the possible paths may be disallowed or designated as invalid. For example, any path that places a phone outside the defined range 120 may be disallowed or heavily penalized during training to enforce latency constraints. As an example, paths that begin with an excessive number of blank symbols before the first phone may be disallowed. As another example, paths that place more than a maximum number of blank symbols between phone labels may be disallowed.

During operation (E), the computer system 102 provides the feature vectors 118a for multiple frames of audio data 112a to the recurrent neural network 130 for processing. The feature vectors 118a are provided to at the input layer of the neural network 130a, e.g., the convolutional layer 132, one by one, in order according to the order of occurrence of the corresponding frame. For example, the feature vector 118a for the first frame is provided, then the feature vector 118a for the second frame is provided, and so on. The data in each feature vector 118a is propagated through the recurrent neural network 130.

During operation (F), the recurrent neural network 130 generates a series of neural network outputs 140 in response to the input feature vectors 118a. The neural network outputs 140 indicate a sequence of labels, one for each frame of the audio data 112a, to indicate the sequence of phones that the neural network 130 estimates is most likely to have occurred. When trained is complete, the neural network 130 indicates the occurrence of each phone within the corresponding constrained range 120 that was defined for the phone. For example, in FIG. 1, the neural network output 140 has indicated the phone label "\ae" at the eighth frame, which is between the defined range 120 between the fourth frame and the tenth frame. Similarly, the phone label "\k" is indicated at the eleventh frame, e.g., as the output of propagating the eleventh frame through the neural network 130, which is within the corresponding range 120 from the sixth frame to the twelfth frame.

For clarity in illustration, the neural network outputs 140 are shown in FIG. 1 as simply the most likely label corresponding to a frame. As discussed above, the recurrent neural network 130 may actually provide a set of multiple values in response to each input feature vector 118a. For example, the recurrent neural network 130 produces an output vector corresponding to each of the input feature vectors 118a received. The output vector can include a score, e.g., a probability score, confidence score, or other value, for each of the respective phones in a set of phones, as well as a score for the blank symbol. The phones can be context-dependent phones.

FIG. 2B is a diagram that illustrates an example output vector 210 of the recurrent neural network 130. The output vector 210 is made up of scores 212a-212h that each correspond to a different symbol or label, with scores 212a-212g each representing a different context dependent phone, and score 212h corresponding to the blank symbol. For example, the score 212a corresponds to the occurrence of the phone "\ae" after the phone "\k" and before the phone "\r," thus representing the sequence "\k \ae \r." Similar scores can be provided for hundreds or thousands of different context dependent phones. The scores 212a-212h represent a likelihood, such as a posterior probability, for the occurrence of the corresponding symbol. In the example of FIG. 2B, the score 212h corresponding to the blank symbol has the highest value, indicating that the neural network indicates that the blank symbol is the most appropriate label to provide at a particular frame position, given the previous series of feature vectors 118a that have been input to the recurrent neural network 130.

Referring again to FIG. 1, during operation (G), based on the neural network output 140 generated by the recurrent neural network 130, the computer system 102 may update the parameters of the recurrent neural network 130, e.g., using a forward-backward algorithm for CTC training Delay can be limited by restricting the set of search paths used in the forward-backward algorithm to those in which the delay between CTC labels and the reference alignment from operation (C) does not exceed a threshold. For example, the allowable search paths, e.g., allowed sequences of labels indicated by the output 140, can be restricted to those that indicate the occurrence of each of the phones within the corresponding constrained ranges 120. Various other techniques may be used to enforce the constraints indicated by the ranges 120. For example, a very high cost or loss may be assigned to penalize outputs that place a phone label outside the appropriate constrained range. In some implementations, the recurrent neural network is initially trained using the CTC algorithm to constantly realign with the Baum-Welch algorithm and trained using a cross-entropy loss. The recurrent neural network 130 is then further trained sequence-discriminatively using the state-level minimum Bayes risk (sMBR) loss.

The training process (B)-(G) may be repeated with different utterances from the training data 110 until one or more performance criteria are satisfied. For example, the training may proceed until examples from a held out data set, e.g., examples not used for training, are classified (i) with at least a minimum level of accuracy and (ii) with phone labels being provided within the constrained ranges at least a minimum level of consistency. The trained recurrent neural network 130 may then be stored and used. Use of the trained recurrent neural network 130 to generate a transcription of an utterance is described below with reference to FIGS. 3 and 4.

Various modifications may be made to the techniques discussed above. For example, different frame lengths or feature vectors can be used. In some implementations, a series of frames may be samples, for example, by using only every third feature vector 118a, to reduce the amount of overlap in information between the frame vectors 118a provided to the neural network 118a.

Figure 2C:
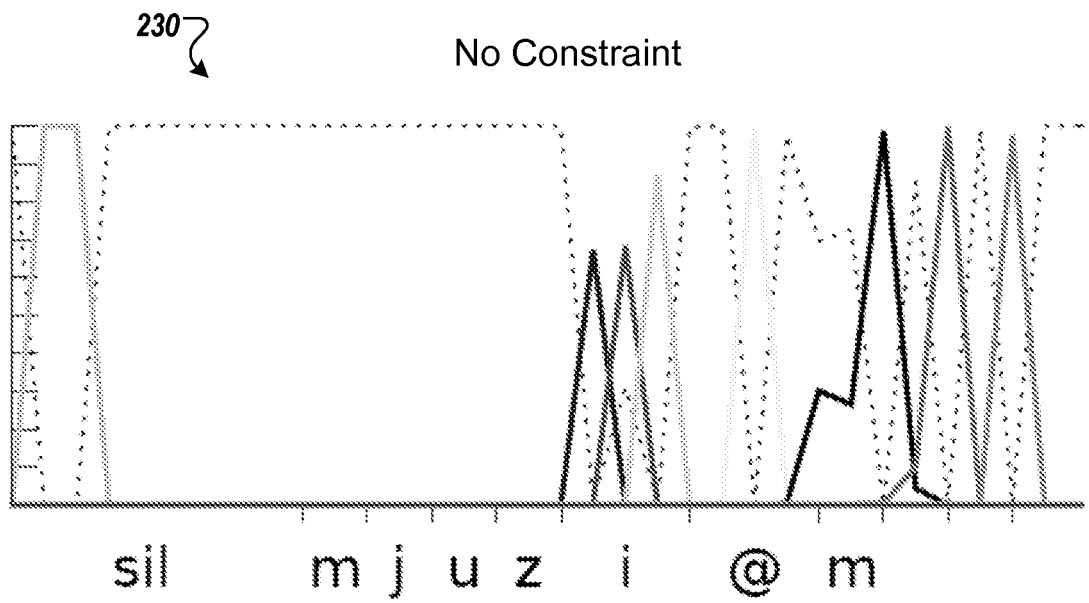
FIGS. 2C and 2D are example graphical representations of phone label posteriors estimated using a neural network system with latency constraints.
Figure 2D:
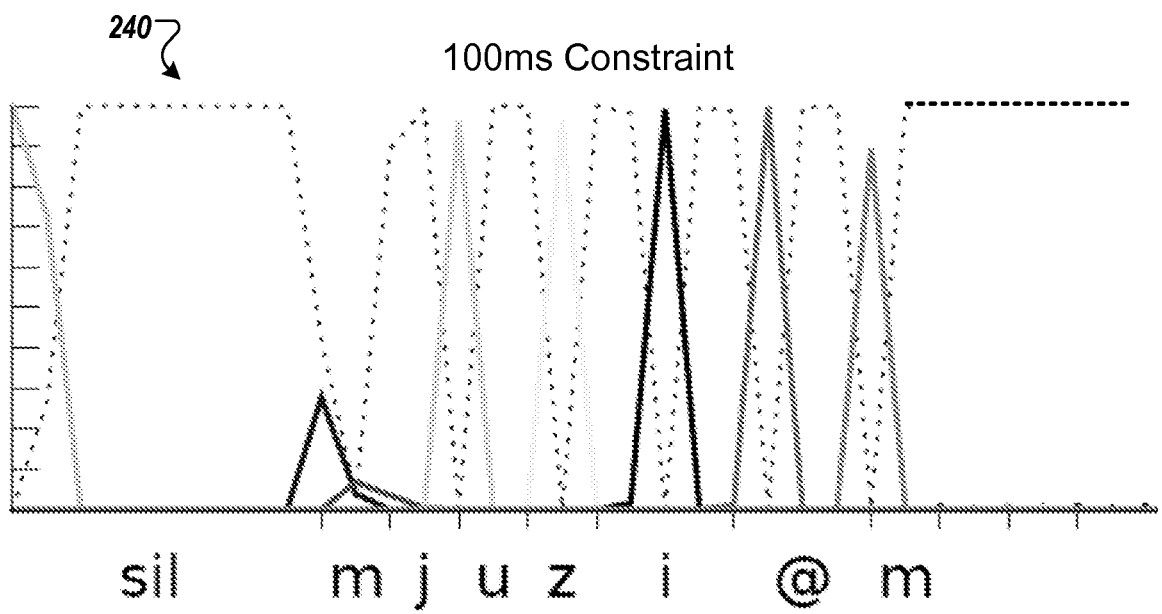

FIGS. 2C and 2D are example graphical representations 230, 240 of phone label posterior probability scores. The graphical representation 230 (FIG. 2C) shows scores generated by a neural network trained without latency constraints. The graphical representation 240 (FIG. 2D) shows scores generated by a neural network trained with latency constraints. For example, the computer system 102 of FIG. 1, appropriately programmed, may be used to estimate the phone label posteriors. The phone label posteriors on the vertical axis are plotted against fixed frame level alignments, e.g., produced by a DNN or other acoustic model, on the horizontal axis showing labels in the alignment on a held out utterance "museum."

FIG. 2C is an example graphical representation 230 of phone label posteriors for the utterance "museum" that have been estimated using a neural network system with no latency constraint. The phone label posteriors exhibit considerable delay in providing the label outputs with respect to the reference alignment. For example, the phone label posterior for the first phone "\m" in the word "museum" occurs significantly later than the occurrence of the phone "\m" in the alignment of the deep neural network, i.e., at a position of the phone "\i." Similar delays can be seen for the remaining phones "\j," "\u," "\z," "\i," "\@," and the second "\m."

FIG. 2D is an example graphical representation 240 of phone label posteriors for the utterance "museum" that have been estimated using a neural network system with a 100-millisecond delay constraint. The phone label posteriors exhibit a reduced delay in providing the label outputs with respect to the alignment of the deep neural network compared to the graphical representation described above with reference to FIG. 2C, which were estimated using a neural network system with no latency constraint. For example, the phone label posterior for the first phone "\m" in the word "museum" occurs close to the occurrence of the phone "\m" in the alignment of the deep neural network. In fact, in this example graphical representation, the phone label posterior for the phone "\m" at the same time that the phone "\m" is indicated to begin in the reference alignment. Similar features of the remaining phone label posteriors can be seen in FIG. 2D.

Figure 2E:
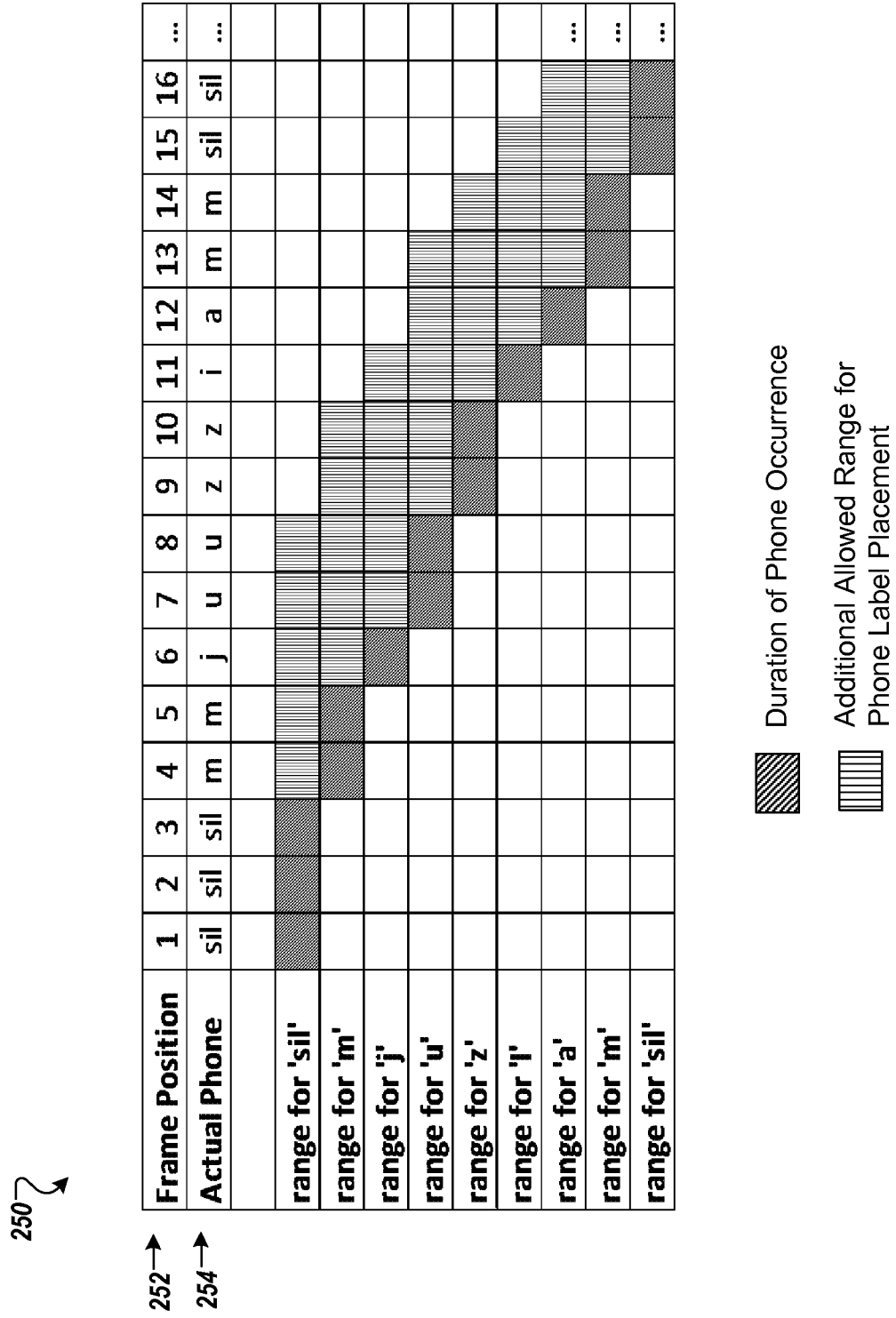
FIG. 2E is a table illustrating examples of constraints on phone labels.

FIG. 2E is table 250 illustrating examples of constraints on phone labels. For example, the constraints shown may represent constraints used by the computer system 102 of FIG. 1, during training. The phone label constraints are illustrated as being placed on the phones in the utterance "museum." In general, the constrained ranges enable the system to limit the amount of future context available before making a phone label prediction, thus limiting the latency at which results are provided.

The table 250 illustrates that the utterance "museum" has been split into a sequence of sixteen frames of data corresponding to a set of time steps. Data may be divided into more or fewer frames. The sixteen possible frame positions 252 are illustrated together with the labels for actual phones 254 that occur during those frame positions 252. For example, silence preceding the utterance "museum" occupies the first three frame positions, and the phone "\m" at the beginning of the utterance occupies the fourth and fifth frame positions. Different phones occupy a different number of frame positions, reflecting different durations of the phones in the spoken utterance.

The table 250 illustrates constrained ranges in which each phone representing the word "museum" may be identified as having occurred. For example, the output of a neural network indicating the initial silence is constrained to the range from the first frame position to the eighth frame position. This includes the range in which the initial silence actually occurs, e.g., the first frame position to the third frame position, and also an additional five frames, up to the eighth frame. Similarly, the phone "\m" is constrained to occur in the range from the fourth frame position to the tenth frame position, which includes the actual positions of the phone at the fourth and fifth frame positions and an additional a five-frame window afterward. Each of the ranges shows a variable set of frame positions 252 in which the neural network may indicate the occurrence of the corresponding phone.

The neural network is further constrained to indicate the occurrence of phone sin the same order that they occur in the utterance. The constrained ranges for each of the phones in the utterance "museum" may overlap, but phones are not permitted to be labeled out of sequence. As a result, providing one phone at the end of its allowed range may further constrain the position that the next phone may be placed. For example, the label for phone "\m" can be validly placed at frame position ten, which is the end of the constrained range. This position overlaps with the allowable ranges for phones "\j," "\u," and "z." However, each of these other phones must be indicated after the label for phone '\m" because they occur after phone "\m" in the utterance. Thus, if phone "\m" were placed in frame position ten, then in order to meet the timing constraint and the sequence constraint, phone "\j" would be required to be placed in frame position eleven, and phone "\u" would be required to be placed in frame position twelve or frame position thirteen.

Other alternative techniques for defining the constraints may be used. For example, the constrained ranges may be determined to begin at a first frame position, and end at a predetermined number of frame positions later. For example, it may be determined that the constrained range for the phone "\m" begins at frame position four and ends six frame positions later. The length of the constrained ranges may be equal for each phone in the utterance, or may vary from one phone to another, or from one instance of a phone to another instance of the same phone. For example, the constrained ranges for the phones "\m" and "\u" are of the same length, i.e., seven frames, while the constrained range for the phone "\j" is of differing length, i.e., six frames.

Figure 3:
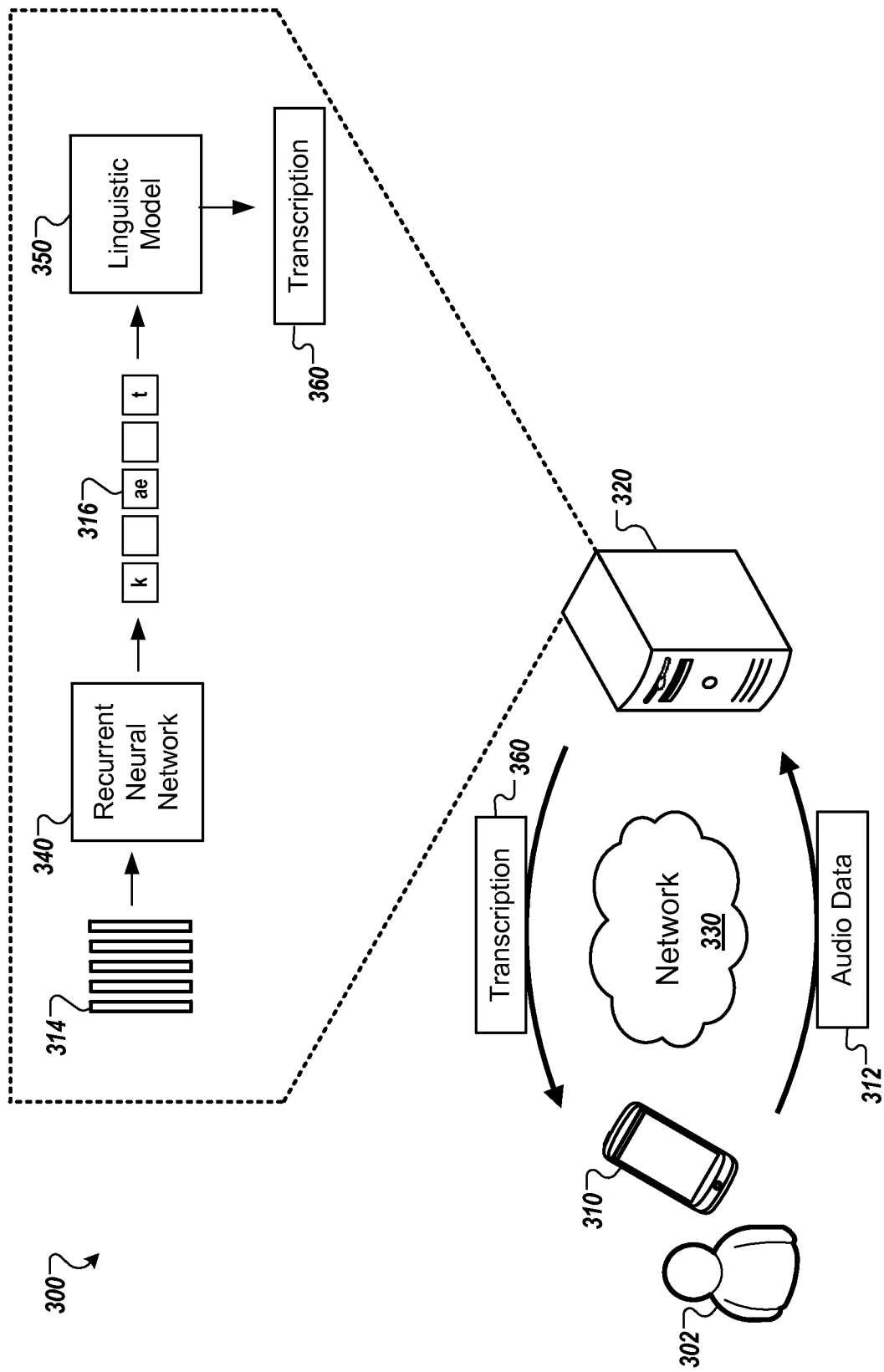
FIG. 3 illustrates an example system for generating a transcription of audio data.

FIG. 3 illustrates example system 300 for generating a transcription of audio data. The system 300 includes a client device 310, a computing system 320, and a network 330. In the example, the computing system 320 provides audio information about an utterance to a trained recurrent neural network 340, e.g., the recurrent neural network 130 after the training described above with respect to FIG. 1. The computing system 320 uses an output from the recurrent neural network 340 to identify a transcription for the utterance. In particular, the computing system 320 can provide a live streaming service in which intermediate results provided to the client device 310 and displayed while the user is still speaking. In this application, unnecessary latency is undesirable, and so limiting the latency of the acoustic model can provide a smoother and more responsive user experience.

The computing system 320 receives audio data 312 that models audio characteristics of a portion of an utterance. For example, the computing system 320 receives streaming or near real-time audio from the client device 310 as the user speaks. The computer system 320 provides inputs to the recurrent neural network 340 based on the audio data 312. The computing system 320 determines a candidate transcription for the utterance based on outputs of the recurrent neural network 340.

The client device 310 can be, for example, a desktop computer, laptop computer, a tablet computer, a wearable computer, a cellular phone, a smart phone, a music player, an e-book reader, navigation system or any other appropriate computing device. The functions performed by the computing system 320 can be performed by individual computer systems or can be distributed across multiple computer systems. The network 330 can be wired or wireless or a combination of both and can include the internet. In the illustrated example, a user 302 of the client device 310 speaks, and the client device 310 records audio data 312 that includes the speech. The client device 310 transmits the recorded audio data 312 to the computing system 320 over the network 330. As the user continues speaking, additional portions of the utterance are recorded and provided to the computing system 320.

The computing system 320 receives the audio data 312 and generates a set of feature vectors 314, where each feature vector indicates audio characteristics during a different portion or window of the audio data 312. Each feature vector may indicate acoustic properties of, for example, a 10 ms, 25 ms, or 50 ms frame of the audio data 312, as well as some amount of context information describing previous and/or subsequent frames.

In the illustrated example, the computing system 320 inputs the feature vectors 314 to the recurrent neural network 340. The recurrent neural network 340 has been trained to act as an acoustic model that outputs CTC labels with latency constraints, as discussed with respect to FIG. 1. For example, the recurrent neural network 340 may be one that has been trained to indicate likelihoods that different speech units have occurred, in the proper sequence and within a maximum latency. Due to the training of the recurrent neural network 340, each phone of the utterance can be indicated within a maximum delay after the information describing a phone has been provided to the recurrent neural network 340, for example, within 100 ms, or within 200 ms, etc., of the last portion of a phone being provided.

The recurrent neural network 340 produces neural network outputs 316, e.g., output vectors that together indicate a set of phone labels. Each output vector can be provided at a consistent rate, e.g., if input vectors to the neural network 340 are provided every 10 ms, the recurrent neural network 340 provides an output vector roughly every 10 ms as each new input vector is propagated through the recurrent neural network 340. The occurrence of each phone may be indicated within a predetermined maximum delay of the feature vectors describing the phone being as input to the recurrent neural network 340. That is, given a regular input sequence, the occurrence of the phone may be provided as one of multiple outputs in a constrained range.

The neural network outputs 316 or the sequence of phones indicated by the outputs 316 are provided to a language model 350. The language model 350 uses the neural network outputs 316 to identify a transcription 360 for the portion of an utterance. The language model 350 can identify text of candidate words or phrases that are likely to represent the sequence of phones that the outputs 316 indicates. For example, the computing system 320 may provide the neural network outputs 316 to, for example, weighted finite state transducers that approximate a hidden Markov model (HMM). The output of the HMM can be a word lattice from which the transcription 360 may be derived. The computing system 320 then provides the transcription 360 to the client device 310 over the network 330. The process of receiving additional audio data and generating and providing transcriptions can be ongoing, with new audio being provided and further transcriptions being provided while the user of the client device 310 continues to speak.

Figure 4:
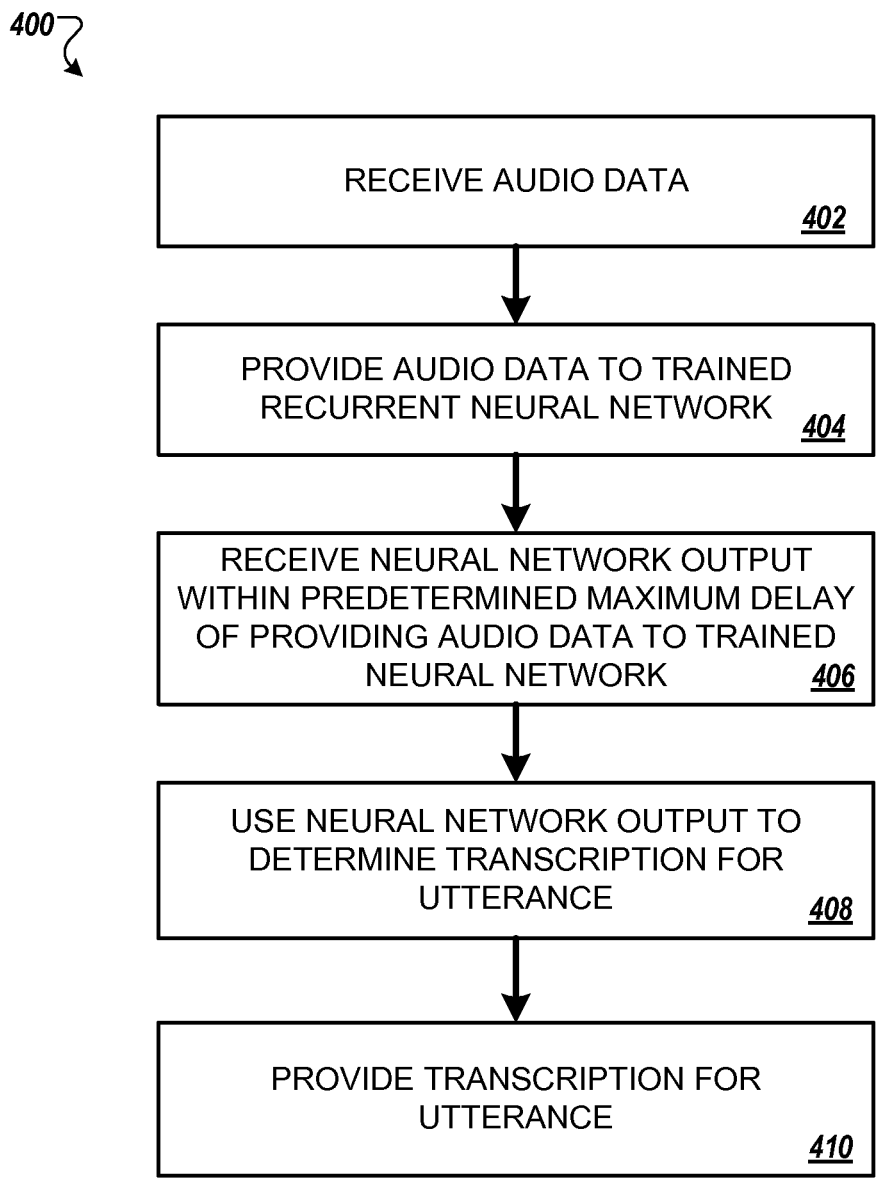
FIG. 4 is a flow diagram of an example process for generating a transcription of audio data.

FIG. 4 is a flow diagram of an example process 400 for generating a transcription of audio data. For convenience, the process 400 will be described as being performed by a system of one or more computers located in one or more locations. For example, speech recognition system, such as the computing system 320 described above with reference to FIG. 3, can perform the process 400.

Audio data that represents a portion of an utterance is received (402). In some implementations, the audio data is received at a server system configured to provide a speech recognition service over a computer network from a client device, and represents a portion of an utterance detected by the client device.

The audio data may include a feature vector for a frame of data corresponding to a particular time step, where the feature vector may include values that indicate acoustic features of multiple dimensions of the utterance at the particular time step. In some implementations, multiple feature vectors corresponding to multiple time steps are received, where each feature vector indicates characteristics of a different segment of the utterance. For example, the audio data may also include one or more feature vectors for frames of data corresponding to times steps prior to the particular time step, and one or more feature vectors for frames of data corresponding to time steps after the particular time step.

The audio data is provided to a trained recurrent neural network (404). For example, the audio data may be provided to a trained neural network implementing latency constraints, e.g., recurrent neural network 130 of FIG. 1. The recurrent neural network has been trained to indicate the occurrence of a phone at any of multiple time frames within a maximum delay of receiving audio data corresponding to the phone. In some implementations, the audio data is provided to a trained recurrent neural network that has been trained to apply CTC labels identifying phones corresponding to input audio data. The recurrent neural network may have been trained such that each of the multiple CTC labels are provided by the model within a predetermined maximum amount of time.

In further implementations, the audio data is provided to a trained recurrent neural network that has been trained using a forward-backward algorithm restricted to search paths in which a delay between assigned CTC labels of phones and actual occurrences of the respective phones does not exceed a maximum amount. Alternatively, the audio data may be provided to a trained recurrent neural network that has been trained to apply penalties in order to penalize search paths in which a delay between assigned CTC labels of phones and actual occurrences of the respective phones exceeds a maximum amount.

In some implementations, the trained recurrent neural network includes a convolutional layer, may be configured such that an input to the trained recurrent neural network is provided to the convolutional layer. In further implementations, the trained recurrent neural network includes one or more long short-term memory (LSTM) layers, and the trained recurrent neural network may be configured to provide output of the convolutional layer to the one or more LSTM layers. In additional implementations, the trained recurrent neural network includes a deep neural network, and the trained neural network is configured to provide output of the one or more LSTM layers to the deep neural network.

In some implementations, the trained recurrent neural network may be trained with a constraint to assign phone labels for an utterance in a same sequence that the phones occur in the utterance. The trained recurrent neural network may be trained to provide context-dependent phone labels.

An output of the trained neural network indicating a phone corresponding to the provided audio data is received within the predetermined maximum delay of providing the audio data to the trained recurrent neural network (406). The received output may be received at a delay determined by the trained neural network that is less than the maximum delay, and may include data assigning a context-dependent phone label identifying the phone corresponding to the provided audio data.

The output of the trained recurrent neural network is used to determine a transcription for the utterance (408). For example, the output of the trained recurrent neural network may be provided to a language model, e.g., the language model 350 of FIG. 3, which determines a transcription for the utterance.

The transcription for the utterance is provided (410). The transcription may be provided to the client device over the computer network in response to receiving the audio data from the client device. For example, the transcription may be provided from a computing system 320 to client device 310 over the computer network 330, as described above with reference to FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
obtaining training audio data comprising a training utterance and connection temporal classification (CTC) labels identifying respective phones that occur in the training utterance;
training a recurrent neural network on the training audio data to indicate the occurrence of the respective phones in a manner that permits differing amounts of delay between (i) input of the training audio data corresponding to the respective phones to the recurrent neural network and (ii) output from the recurrent neural network model indicating occurrence of the respective phones and constrains the amounts of delay such that each is no more than a predetermined maximum delay by:
obtaining a reference alignment indicating ground truth positions that the CTC labels occur in a sequence of frames representing the training utterance; and
for each CTC label, setting a respective constrained range of frames in the sequence of frames that begins at a respective ground truth starting frame of the reference alignment and ends a predetermined number frames after a respective ground truth ending frame of the reference alignment;
receiving audio data representing a portion of an utterance;
providing the audio data to the trained recurrent neural network;
receiving, within the predetermined maximum delay after providing the audio data to the trained recurrent neural network, output of the trained recurrent neural network indicating that a particular phone corresponds to the provided audio data;
using the output of the trained recurrent neural network to determine a transcription for the utterance; and
providing the transcription for the utterance.

2. The method of claim 1, wherein the trained recurrent neural network has been trained using a forward-backward algorithm restricted to search paths in which a delay between the respective constrained range of frames for each CTC label and actual occurrences of the respective phones does not exceed a maximum amount.

3. The method of claim 1, wherein the trained recurrent neural network has been trained to apply penalties in order to penalize search paths in which a delay between the respective constrained range of frames for each CTC label and actual occurrences of the respective phones exceeds a maximum amount.

4. The method of claim 1, wherein the trained recurrent neural network comprises a convolutional layer, and the trained recurrent neural network is configured such that input to the trained recurrent neural network is provided to the convolutional layer.

5. The method of claim 4, wherein the trained recurrent neural network comprises one or more long short-term memory layers, and the trained recurrent neural network is configured to provide output of the convolutional layer to the one or more long short-term memory layers.

6. The method of claim 5, wherein the trained recurrent neural network comprises a deep neural network, and the trained recurrent neural network is configured to provide output of the one or more long short-term memory layers to the deep neural network.

7. The method of claim 1, wherein the respective constrained range of frames for at least one of the CTC labels comprises a different number of frames than the respective constrained ranges of frames for the other CTC labels.

8. The method of claim 1, wherein:
the trained recurrent neural network has been trained to provide context-dependent phone labels; and
receiving the output of the trained recurrent neural network comprises receiving, at a delay determined by the trained recurrent neural network that is less than the maximum delay, data assigning a context-dependent phone label identifying the phone corresponding to the provided audio data.

9. The method of claim 1, wherein:
the audio data representing the portion of the utterance is detected by a client device;
the audio data representing the portion of the utterance is received from the client device at a server system configured to provide a speech recognition service over a computer network; and
providing the transcription comprises providing, by the server system, the transcription to the client device over the computer network in response to receiving the audio data from the client device.

10. A system comprising one or more computers and one or more storage devices storing instructions that are operable, when executed by the one or more computers, to cause the one or more computers to perform operations comprising:
obtaining training audio data comprising a training utterance and connection temporal classification (CTC) labels identifying respective phones that occur in the training utterance;
training a recurrent neural network on the training audio data to indicate the occurrence of the respective phones in a manner that permits differing amounts of delay between (i) input of the training audio data corresponding to the respective phones to the recurrent neural network and (ii) output from the recurrent neural network model indicating occurrence of the respective phones and constrains the amounts of delay such that each is no more than a predetermined maximum delay by:
obtaining a reference alignment indicating ground truth positions that the CTC labels occur in a sequence of frames representing the training utterance; and
for each CTC label, setting a respective constrained range of frames in the sequence of frames that begins at a respective ground truth starting frame of the reference alignment and ends a predetermined number of frames after a respective ground truth ending frame of the reference alignment;
receiving audio data representing a portion of an utterance;
receiving, within the predetermined maximum delay after providing the audio data to the trained recurrent neural network, output of the trained recurrent neural network indicating that a particular phone corresponds to the provided audio data;
using the output of the trained recurrent neural network to determine a transcription for the utterance; and
providing the transcription for the utterance.

11. The system of claim 10, wherein the trained recurrent neural network has been trained using a forward-backward algorithm restricted to search paths in which a delay between the respective constrained range of frames for each CTC label and actual occurrences of the respective phones does not exceed a maximum amount.

12. The system of claim 10, wherein the trained recurrent neural network has been trained to apply penalties in order to penalize search paths in which a delay between the respective constrained range of frames for each CTC label and actual occurrences of the respective phones exceeds a maximum amount.

13. The system of claim 10, wherein the trained recurrent neural network comprises a convolutional layer, and the trained recurrent neural network is configured such that input to the trained recurrent neural network is provided to the convolutional layer.

14. The system of claim 13, wherein the trained recurrent neural network comprises one or more long short-term memory layers, and the trained recurrent neural network is configured to provide output of the convolutional layer to the one or more long short-term memory layers.

15. The system of claim 14, wherein the trained recurrent neural network comprises a deep neural network, and the trained recurrent neural network is configured to provide output of the one or more long short-term memory layers to the deep neural network.

16. The system of claim 10, wherein the respective constrained range of frames for at least one of the CTC labels comprises a different number of frames than the respective constrained ranges of frames for the other CTC labels.

17. One or more non-transitory computer-readable media having instructions stored thereon that are executable by one or more processing devices and upon such execution cause the one or more processing devices to perform operations comprising:
obtaining training audio data comprising a training utterance and connection temporal classification (CTC) labels identifying respective phones that occur in the training utterance;
training a recurrent neural network on the training audio data to indicate the occurrence of the respective phones in a manner that permits differing amounts of delay between (i) input of the training audio data corresponding to the respective phones to the recurrent neural network and (ii) output from the recurrent neural network model indicating occurrence of the respective phones and constrains the amounts of delay such that each is no more than a predetermined maximum delay by:
obtaining a reference alignment indicating ground truth positions that the CTC labels occur in a sequence of frames representing the training utterance; and
for each CTC label, setting a respective constrained range of frames in the sequence of frames that begins at a respective ground truth starting frame of the reference alignment and ends a predetermined number of frames after a respective ground truth ending frame of the reference alignment;
receiving audio data representing a portion of an utterance;
receiving, within the predetermined maximum delay after providing the audio data to the trained recurrent neural network, output of the trained recurrent neural network indicating that a particular phone corresponds to the provided audio data;
using the output of the trained recurrent neural network to determine a transcription for the utterance; and
providing the transcription for the utterance.

* * * * *